April 8, 1958      F. DEL CHIOCCA      2,830,260
COMBINATION VALVE AND CONDUCTIVITY CELL ASSEMBLY
Filed Jan. 5, 1954      3 Sheets-Sheet 1
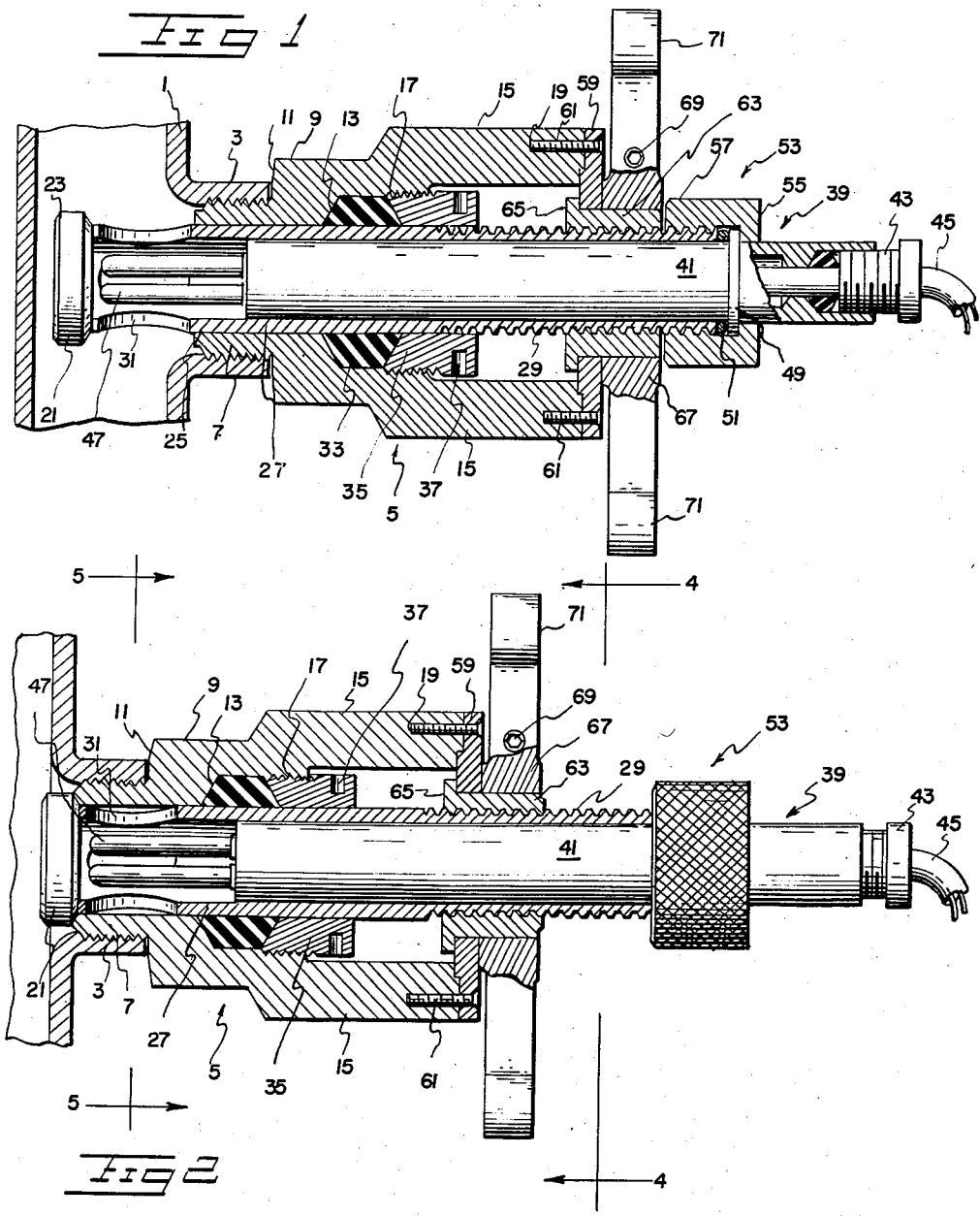
INVENTOR
Frank Del Chiocca
BY
Peck & Peck
ATTORNEYS

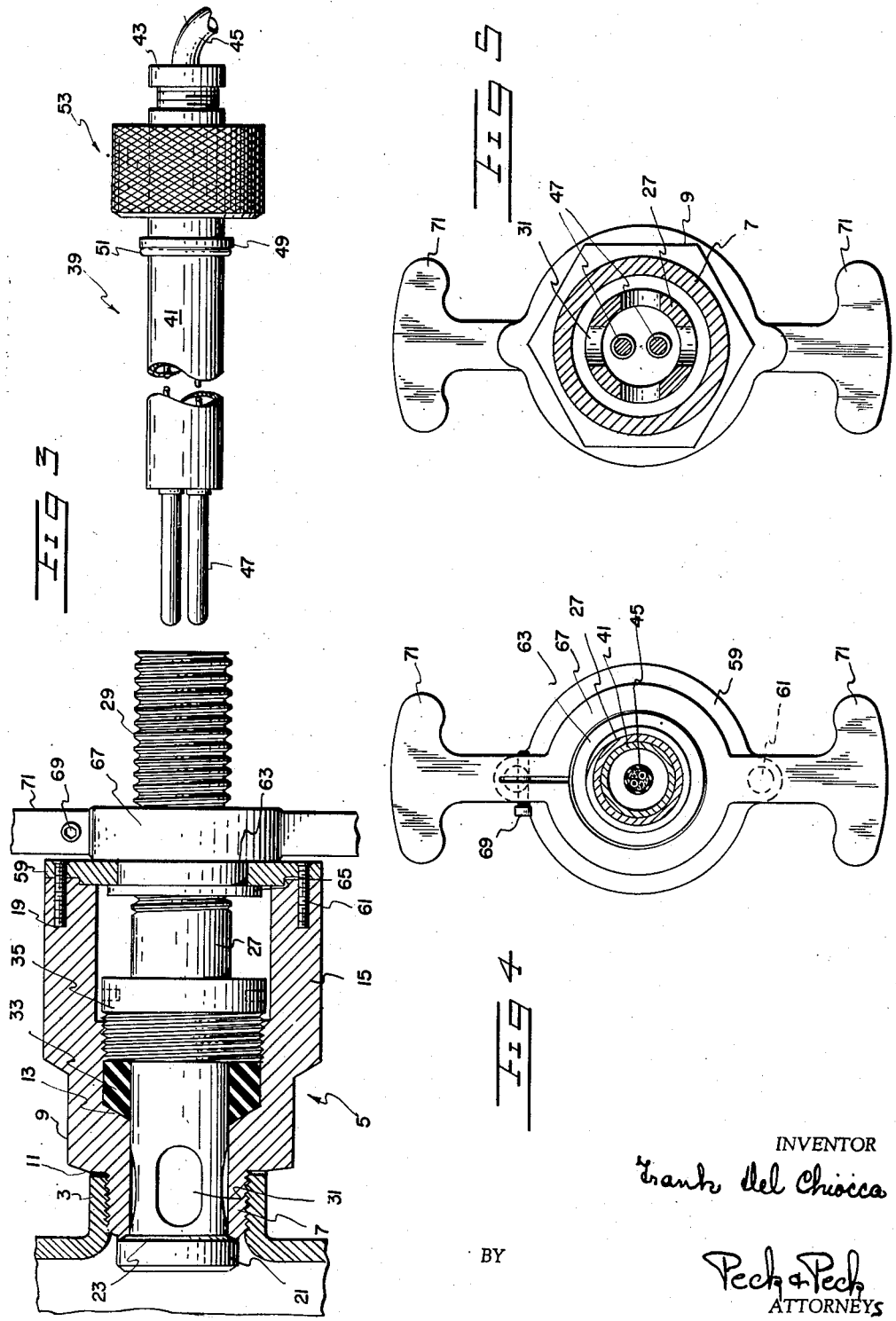

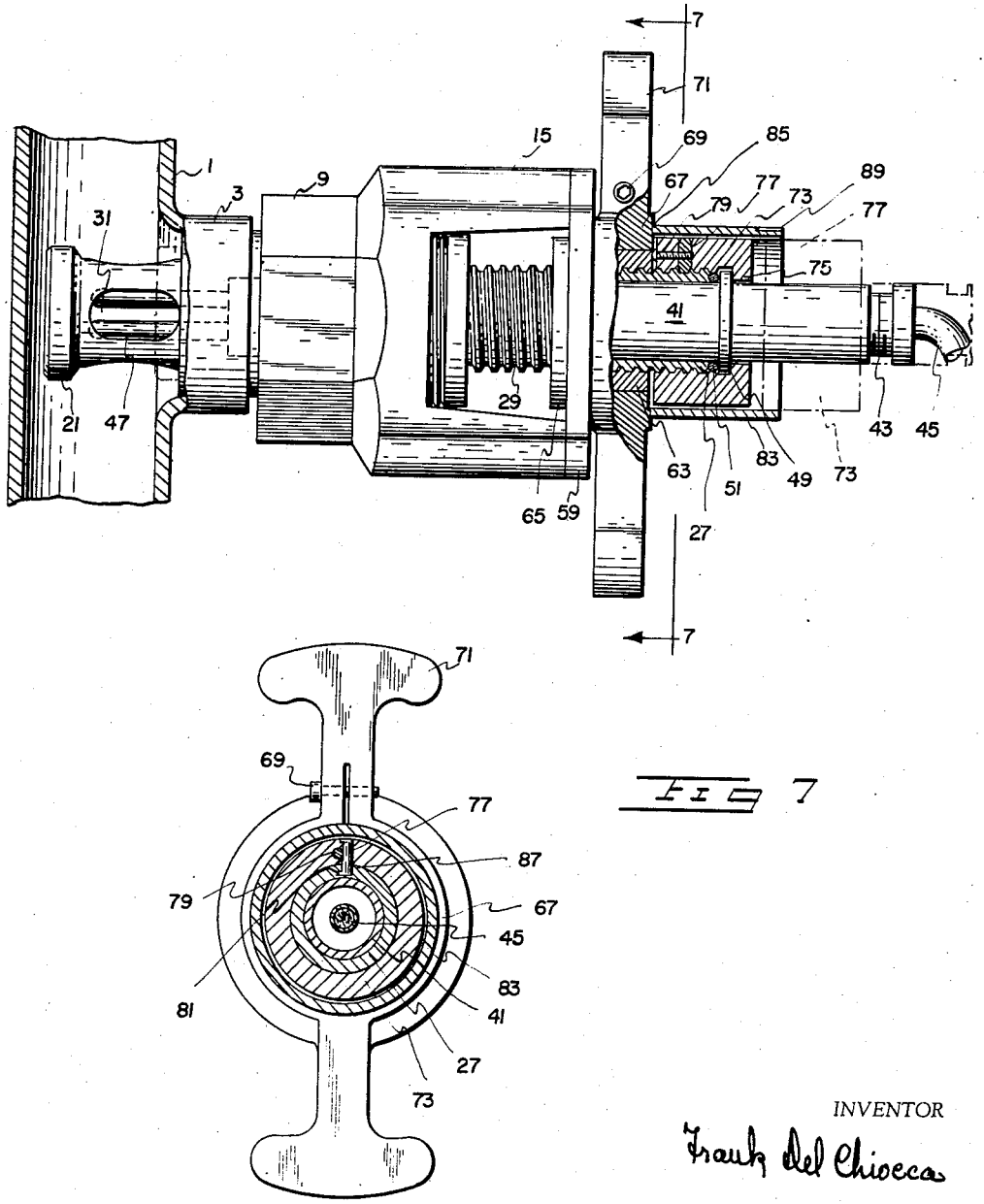

United States Patent Office 2,830,260
Patented Apr. 8, 1958

2,830,260

COMBINATION VALVE AND CONDUCTIVITY CELL ASSEMBLY

Frank Del Chiocca, New York, N. Y., assignor to McNab, Incorporated, New York, N. Y., a corporation of New York Application January 5, 1954, Serial No. 402,356

3 Claims. (Cl. 324—30)

This invention relates broadly to the art of valves for use in electrical systems for measuring and indicating the concentration of electrical conductive impurities in liquids and in its more specific aspects it relates to an assembly for mounting a conductivity cell in operative position with the electrodes thereof projected into a liquid flow conduit through an opening therein for immersion of the electrodes within the liquid, and provides mounting means including a valve whereby the conductivity cell may be retracted from operative position within the liquid flow conduit for replacement and/or repair while at the same time the valve is actuated to close the opening in the liquid flow conduit in order to prevent escape of liquid therefrom; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

The conductivity cells with which my invention particularly pertains are adapted to test the concentration of electrical conductive impurities within a liquid flowing within a conduit, or in a liquid contained in a tank or the like. Among other uses, cells of this character are advantageously used in measuring and indicating the salt concentration in water flowing through conduits to boilers, engines, condensers and the like on ships. It is conventional practice to provide an opening in the wall of the liquid flow conduit, or of a tank, in which the housing for the conductivity cell is fixed in such manner that the electrodes of the cell are disposed within the liquid under test. In actual practice it has been found that the electrodes must be replaced or cleaned or repairs made thereto or to the cell at relatively frequent intervals as they become corroded and otherwise incapable of properly performing their measuring function. When it is necessary to replace or otherwise repair the electrodes or any other elements or parts of the conductivity cell, it will be obvious that it is essential to withdraw the conductivity cell from the opening through which it projects into the interior of the liquid flow line or the tank. Since most of the liquids being tested are under considerable pressure, and in any event, it will be evident that some means must be provided for either closing the opening in the liquid flow conduit or tank immediately following retraction and removal of the conductivity cell or of providing some means either directly in the opening or adjacent thereto for preventing escape of the liquid from the conduit or tank.

In this embodiment of my invention I have illustrated and described an adaptation of my invention to liquid flow conduits, but it is to be understood that it is fully within my contemplation to use this valve assembly in tanks or the like where the liquid to be tested is stored and is still.

It has been more or less conventional practice to moveably mount the conductivity cell and its assembly within an elongated housing which is fixedly mounted on the liquid flow conduit at the opening thereof and to provide this housing with a gate valve or the like. In such arrangements the conductivity cell is removably mounted in the housing in sealed relation with respect thereto so there will be no escape of liquid when the cell is operatively fixed in the housing. This has necessitated the utilization of a variety of sealing rings, retaining elements and the like.

In apparatus of this character of which I am aware, the removal of a conductivity cell for replacement or repair of parts thereof constitutes a considerable task for it is necessary to release the various sealing means mentioned above so that the conductivity cell and its assembly may be withdrawn from the housing, and in this operation it is necessary to actuate the gate valve in the housing as soon as the cell has been withdrawn past the point in the housing where the gate valve is positioned in order to prevent the escape of liquid rearwardly from the housing. In this operation of removing the cell it is often damaged due to the closing of the gate valve before the cell has been withdrawn a sufficient distance so that it is past the gate valve. My invention has overcome this disadvantage in prior assemblies of this character and therefore one of my major purposes has been to devise a valve and cell assembly which positively prevents the cell from being damaged when the valve is being closed. It will be appreciated that the usual type of mounting and the assembly arrangement for a conductivity cell is inherently complex and disadvantageous in the consumption of considerable time and effort in the operation of removing the cell from its mounted operative position. It is also a fact that the present known arrangements for mounting a conductivity cell in operative position as described is expensive not only in time required to assemble and disassemble but also in the number of parts and elements required for the assembly.

It has been one of my main purposes in evolving this invention to overcome the complexities and disadvantages which are inherent in such mounting arrangements of which I now know. The invention I am about to describe provides a simple mounting assembly for a conductivity cell which may be assembled and disassembled with facility and which insures against the escape of the liquid which is flowing in the conduit and which is under test.

In overcoming the disadvantages of structure and operation of mounting assemblies and arrangements for conductivity cells in liquid flow conduits I have eliminated many of the parts and elements previously used and have provided an assembly, including a valve, which reduces the number of manual operations necessary to remove the cell from operative position in the assembly or to associate it with the assembly into operative position. In prior assemblies of which I know a considerable number of manipulative operations are necessary to remove or replace the cell.

I have devised a unique valve particularly adapted for the purposes of this invention. This valve includes a head and a tubular body portion or stem which removably mounts therein the conductivity cell. The valve is reciprocably carried within a housing which is mounted in the opening in the liquid flow conduit and is coactive with the housing to close the opening in the conduit for removal of the conductivity cell. Since the conductivity cell is removably mounted in the valve body for reciprocation therewith it will be appreciated that in the open position of the valve the electrodes of the cell will be disposed in operative position immersed in the liquid under test while in closed position of the valve the electrodes and cell will be retracted from operative position for complete removal of the cell from the valve housing.

I have evolved simple and efficient means in the combination whereby the conductivity cell may not be withdrawn from its operative position within the tubular valve stem when the valve is open, but may only be withdrawn when the valve is closed.

In order to increase the effectiveness of this valve and cell assembly I have devised a simple sealing or gland arrangement which I have combined with the valve housing and the reciprocable tubular valve stem so that when the valve is in open position with the electrodes in position projecting into and immersed in the liquid under test there will be no leakage of the liquid between the fixed valve housing and the reciprocable tubular valve stem. I have accomplished this highly desirable and necessary sealing arrangement with a minimum number of parts and elements which require practically no attention whatsoever.

I have also provided a sealing arrangement between the relatively movable tubular valve stem and the body of the conductivity cell which is movably mounted in the valve stem to prevent the escape of liquid between these two relatively movable members so that the entire apparatus is completely sealed against liquid escape regardless of whether the valve is in open or closed position.

It has also been one of my purposes in designing this combination valve and conductivity cell assembly to provide operating means for opening and closing the valve and for removing the conductivity cell from its mounted position within the valve stem which is easily actuable and is readily accessible to the operator of the apparatus. It will be appreciated that the simplicity of the apparatus and its solution of many of the problems and disadvantageous characteristics of prior operative mounting arrangements of conductivity cells will result in substantial operating efficiencies and economies. I have devised a combination valve and conductivity cell assembly having relatively few operating parts which may be assembled quickly and easily and which will function under normal conditions of use for relatively long periods of time without requiring attention or the replacement of parts.

The valve of this invention may be conveniently lapped to provide a good metal to metal seal preventing escape of liquid.

With the foregoing general objects, features and results in view, as well as certain others which will be apparent from the following explanation, the invention consists in certain novel features in design, construction, mounting and combination of elements, as will be more fully and particularly referred to and specified hereinafter.

In the accompanying drawings:

Fig. 1 is a view in longitudinal section of the unit in mounted position with the valve open, the valve head and the portion of the conductivity cell within the tubular valve stem being shown in side elevation.

Fig. 2 is a view in longitudinal section of the unit in mounted position with the valve closed, the valve head and the conductivity cell being shown in side elevation.

Fig. 3 is a view in longitudinal section through the valve housing, the valve being closed and the conductivity cell being shown fully removed from its operative position within the valve stem, the conductivity cell and the remaining parts of the assembly, with the exception of the valve housing, being shown in side elevation.

Fig. 4 is a view taken on line 4—4 of Fig. 2.

Fig. 5 is a view taken on line 5—5 of Fig. 2.

Fig. 6 is a plan view of a modified form of assembly with the valve in open position, parts of the assembly being illustrated in longitudinal section.

Fig. 7 is a view taken on line 7—7 of Fig. 6.

In Figs. 1 through 5 of the accompanying drawings I have used the numeral 1 to designate a union fitting or the like in a liquid flow conduit through which the liquid to be tested is flowing, the union having a radial threaded section 3 which is adapted to mount the valve and conductivity cell assembly as will be hereinafter described.

While I have disclosed a liquid flow conduit through which the liquid to be tested is adapted to flow it will be appreciated that the liquid to be tested may be in a tank or any other suitable type of container, and may be still as distinguished from flowing. Thus, where the term "liquid flow conduit" is used in the specification and claims it is intended to include a tank or the like as well as a flow line. As I have hereinbefore pointed out one use for my valve and conductivity cell assembly is in systems for measuring and indicating the concentration of salt in water flowing through conduits to boilers, engines, condensers and the like on ships and such systems include one or more test or conductivity cells which are inserted into the boiler or like feed system at locations which may be specified by the designer of the ship. In the example illustrated in the drawings I have shown one of the locations in a feed system where a valve and conductivity cell is mounted in the liquid flow conduit.

The valve and cell assembly of this invention includes a valve housing designated generally by the reference character 5 and this housing is provided on its forward end with an externally threaded nipple 7 adapted to be threadedly associated with the section 3 for mounting the entire assembly in a manner to be hereinafter explained. Rearwardly of the nipple 7 I form the housing externally in hexagonal configuration as at 9 thereby providing a shoulder 11 at the rear end of the nipple, while the internal diameter of the housing is increased relative to that of the nipple forming an annular internal rearwardly inclined shoulder 13. A pair of rearwardly extending arms 15 project from the body or hexagonal portion 9 of the housing and each of these arms is provided with a forward internal threaded portion 17 and on the rear end or face each arm is tapped as at 19.

The housing 5 reciprocably mounts a valve of unique structure therein which valve includes an annular disc-like head 21 having the rear edge thereof bevelled as at 23 to abut in closed position of the valve a complementary bevelled valve seat 25 which is formed on the forward edge of the nipple 7. The valve includes a tubular valve stem 27 which is of an external diameter providing a sliding fit with the interior surfaces of the nipple and portion 9 of the housing when the stem is mounted therein. The valve stem is externally threaded as at 29 a distance forwardly from the rear end thereof. The valve head 21 is formed and carried on the forward end of the valve stem and adjacent its forward end the stem is provided with elongated apertures or openings 31 therein for a purpose which will become clear as this description proceeds.

The valve assembly is mounted within the housing 5 with the stem extending therethrough and through the nipple 7 with the head extended forwardly of the nipple. The tubular valve stem is reciprocably mounted within the nipple and housing and escape or substantial leakage between these relatively movable members is prevented by a packing gland comprising a rubber or the like suitable material packing ring 33 which is compressed against shoulder 13 and the outer surface of stem 27 by means of an externally threaded retaining ring 35 which in operative position is threaded on the internal threads 17 which are provided on housing 5. Radially extending wrench receiving recesses 37 may be provided in ring 35.

The tubular valve stem 27 is adapted to removably mount therein for reciprocation therewith a conductivity cell designated in its entirety by the numeral 39. The conductivity cell has a cylindrical body portion 41 which carries the necessary components normally found in conductivity cells. The rear end of body 41 may be closed by a hollow threaded plug or the like 43 through which the electric wires 45 for the cell extend. A pair of electrodes 47 project from the forward end of the cell and in this particular example of my invention I have illustrated pencil type electrodes. It is to be clearly understood that my invention is operative with electrodes of any type or configuration. Adjacent to but forwardly spaced from the rear end of body 41 of the conductivity cell I form an annular rib 49 and position a rubber or the like material sealing ring 51 in engagement with the forward surface of the rib 49. In order to releasably maintain the conductivity cell in operative position within the tubular valve stem a locking nut designated generally by numeral 53 having a head or cap 55 and an internally threaded skirt 57 is adapted to be screwed on threads 29 of the valve stem until the sealing ring 51 is compressed between the rear end of the valve stem and the rib 49. The cap of the nut being in engagement with the rib will of course maintain the cell in position within the stem while at the same time the compressed sealing ring 51 will prevent escape of liquid from between the body of the cell and the valve stem.

The mechanism I have devised for causing reciprocation of the valve and its contained conductivity cell includes a keeper ring 59 which is removably fixed to the rear end surfaces of the housing arms 15 by means of screws 61 threaded in the holes 19 which are provided in the rear ends of said arms. The internal diameter of the ring 59 is substantially greater than the external diameter of the tubular valve stem 27 for a purpose which will become apparent. In order to reciprocate the valve assembly and its contained conductivity cell within the valve housing I provide a sleeve-like nut 63 threaded on the external threads 29 of tubular valve stem 27, the nut being provided with an annular flange 65 extending radially from the forward end of the nut and adapted to abut against the fixed surface formed by the forward face of the keeper ring 59. Actuating means for rotating the nut 63 is provided and this may take the form of a split ring 67 circumferentially enveloping the nut 63 and fixedly clamped thereto by means of a transverse screw 69 and for leverage and convenience of actuation the split clamping ring may be provided with diametrically opposed operating handles 71. Any other suitable means for causing rotation of the nut and the split ring may be employed and still fall within the spirit and scope of my invention.

With the valve and conductivity assembly mounted within a liquid flow conduit 1 or within a tank containing the liquid to be tested, the valve housing 5 is removably mounted therein by threading the nipple 7 thereof into the fitting or union 3 until the shoulder 11 of the housing is in position adjacent to the nipple, all as particularly illustrated in Fig. 1 of the drawings. In this figure the valve head 21 is in operative position with the bevel 23 thereof removed and unseated relative to the valve seat 25 which is provided on the end of the nipple, and the conductivity cell 39 is positioned within the tubular valve stem in such manner that the electrodes 47 thereof extend into the forward portion of the valve stem adjacent to the apertures 31 therein. In this position of the parts of my apparatus it will be apparent that the electrodes 47 are immersed in the liquid flowing through the liquid conduit due to the fact that liquid will flow through all of the apertures 31 and about and in full contact with the electrodes. Leakage of liquid between the housing 5 and the valve stem 27 is prevented by the packing ring 33 while escape of liquid from between the circumferential exterior surface of the body 41 of the conductivity cell and the interior surface of the tubular valve stem is prevented by the action of the sealing ring 51 which is compressed between the end of the tubular valve stem and the rib 49 by means of the lock nut 53. It will also be recognized that with the whole assembly in operative salinity testing position as disclosed in Fig. 1, the removal of the conductivity cell from its position within the tubular valve stem will be prevented since the nut 53 is threaded on the threaded portion of the tubular valve stem and the cap of the nut being engaged with rib 49 will restrain outward axial movement of the conductivity cell. To release the cell it is only necessary to turn the lock nut.

When it is desired to replace, repair or inspect the electrodes or the conductivity cell, and it is therefore desired to remove the cell from its mounted position within the valve stem, the following relatively simple operational steps are followed. The operating handle or handles 71 are grasped by the operator of the device and rotated and through the action of split clamping ring 67 which is clampedly fixed to nut 63 the nut is rotated on the threaded section 29 of the tubular valve stem. The nut 63 is restrained from rearward axial movement due to the abutment of the flange 65 of the nut against the forward face of the keeper ring 59, and it will be apparent that forward axial movement of the nut is prevented because of the engagement of the clamping ring 67 against the rear face of the keeper ring 59. It will be evident that the keeper ring, since it is fixed to the housing 5 which is in turn fixedly mounted to the stationary liquid flow conduit 1, will itself provide a fixed or stationary element. Therefore since the nut 63 and the clamping ring engage the keeper ring the nut is thereby restrained against axial movement and will upon rotation produce axial movement in the valve stem which is reciprocably mounted within the housing and acts as an operating screw. Thus, with the apparatus in operative position as illustrated in Fig. 1 rotation of the nut 63 by means of the operating handle 71 in the proper direction will cause axial rearward movement in the tubular valve stem and its contained conductivity cell to thereby retract the entire valve and cell assembly until the valve head 21 is seated on the valve seat 25 to thereby close the opening in the liquid flow conduit 1. It will be understood that rotation of the valve stem will be prevented by the friction which is set up between the packing gland 33 and the valve stem.

This inoperative or closed position of the valve following the rotation of the nut 63 is particularly illustrated in Fig. 2 of the drawings. When the tubular valve stem and its contained conductivity cell assembly has been retracted into valve closing position as shown in Fig. 2 of the drawings, the locking nut 53 is rotated or unscrewed into the loose or free position disclosed in Fig. 3 whereupon the rearwardly projecting portion of the body 41 may be grasped and the entire conductivity cell 39 including the electrodes withdrawn from its mounted position within the tubular valve stem. The conductivity cell assembly in its position withdrawn from the valve and valve housing is illustrated in Fig. 3 of the drawings.

It will be apparent that no escape of liquid will occur due to the closing of the outlet in the liquid flow conduit by the seating of the valve head 21 on the seat 25 which is provided on the end of the nipple of the housing. It will also be apparent that the simplification of the dismantling or disassembly of the apparatus is substantial without adding to the cost of production of the entire assembly.

To remount the conductivity cell assembly into operative position it is merely necessary to insert the body of the cell into the tubular valve stem until the electrodes are in position within the area defined by that portion of the valve stem which is provided with the apertures 31 whereupon the locking nut 53 is tightly threaded on the threads 29 of the tubular valve stem. Then the operating members 71 are rotated in the opposite direction to thereby project the valve stem and its contained cell into position so that the electrodes 47 are immersed in the liquid being tested and at the same time, of course, the valve head 21 will be projected forwardly into open or unseated position for operation of the device in measuring and indicating the salinity of the liquid being tested.

In valve and conductivity cells of the character of those here involved it is desirable to provide means which will prevent the removal of the conductivity cell from its mounted operative position within the tubular valve stem when the valve is open. It will be evident that removal of the cell when the valve is open would allow the liquid to escape through the tubular valve stem.

I have devised a simple arrangement involving substantially no working parts whereby the lock nut 53 may not be manually or otherwise unscrewed when the valve is open and I have accomplished this by arranging parts of the assembly in such relationships that the lock nut is in inaccessible position when the valve is open, thus it may not be reached for unscrewing to release the cell from its operative mounted position. When the valve is closed the lock nut automatically assumes a position which is accessible so that it may be unscrewed for release of the conductivity cell.

In Figs. 6 and 7 I have illustrated a valve and conductivity cell assembly which includes the means preventing removal of the cell when the valve is open and in these figures I have used the same reference characters as used in Figs. 1 through 5 to designate similar parts.

In the form of my invention about to be described the assembly is generally the same as that illustrated in Figs. 1 through 5 of the drawings, however I provide the added means whereby the cell may not be removed when the valve is open.

In this form of my invention I provide a lock nut 73 having a radially inwardly extending flange 75 which is adapted to abut against the annular rib 49 on the cell 41 when the lock nut 73 is threaded on the threaded portion 29 of the tubular valve stem to thereby maintain the conductivity cell in operative position within the tubular valve stem. I insert a pin 77 in a radial hole which is provided in nut 73 and the pin is adapted for radial movement in the hole which is limited by a screw 79 which extends into the nut in position therein to limit outward movement of the pin by engaging a shoulder 81 which is formed on the pin.

I provide a sleeve 83 of greater internal diameter than the external diameter of lock nut 73, and in this particular example of one arrangement of my invention I fix one end of the sleeve by soldering, welding or the like, to the split ring 67 as at 85 to extend rearwardly therefrom. The sleeve is of greater length than the thickness of the lock nut, and as will be apparent from consideration of the drawings the sleeve encompasses and shields the lock nut when the valve 21 is in open position as disclosed in Fig. 6 of the drawings.

A slot 87 is formed in the threaded portion 29 of the tubular valve stem forwardly a distance from the rear end thereof and the position of this slot is indicated by a groove 89 which may be formed in the sleeve in alignment with the slot in the threads.

When the valve is closed and the conductivity cell is being releasably positioned in operative position in the tubular valve stem the lock nut 73 is threaded on the rear end of the tubular valve stem and the pin 77 rides on the threads 29 and is in extended position as shown in dotted lines in Fig. 6 with the head thereof radially extended beyond the internal surface of sleeve 83. When the lock nut is fully threaded on the end of the tubular valve stem the pin will be over and drop into the slot 87 so that the head thereof will be clear of the sleeve. The valve may then be opened by rotating nut 63 by means of the operating handles 71 whereupon the valve stem, conductivity cell and lock nut 73 will be projected forwardly and in open position of the valve, the lock nut will be fully received within the sleeve as shown in Fig. 6. In this position the lock nut is completely inaccessible and cannot be unscrewed for release and removal of the conductivity cell. Furthermore the lock nut cannot be rotated since pin 77 is within slot 87 and cannot move radially outwardly therefrom because the head thereof would engage the sleeve. When the valve is closed the lock nut is projected rearwardly and outside the confines of the sleeve and may then be unscrewed from the valve stem.

While I have shown the sleeve as fixed to the ring 67 it is within my contemplation to form it in various other ways, and any arrangement wherein the lock nut is concealed and inaccessibly positioned within a sleeve-like member when the valve is open falls within the spirit and scope of my invention.

It will be appreciated that I have provided a simple arrangement whereby the means for releasing the conductivity cell from its mounted position is completely concealed and inaccessible when the valve is open to thereby fully eliminate the possibility of a careless or inexperienced operator removing the cell when the valve is open.

I claim:

1. A valve and a conductivity cell assembly including in combination, a housing having arms extending rearwardly therefrom and a valve seat on the forward end thereof and said housing adapted to be mounted on and in communication with a liquid flow conduit containing a liquid to be tested, a tubular valve stem mounted in said housing for axial movement therein and provided with a valve on the forward end thereof adapted to seat on the valve seat on the forward end of the housing in closed position to prevent entry of the liquid under test into the tubular valve stem, the tubular valve stem having openings in the circumferential wall thereof adjacent said valve, and means for causing axial movement of said tubular valve stem within said housing including an external threaded section on said tubular valve stem, a nut threaded on said threaded section for rotation relative to the tubular valve stem, and further means restraining said nut against axial movement relative to said tubular valve stem and mechanism for rotating said nut to move the valve stem and valve to and from closed position, said further means including an annular radial flange on one end of said nut and a ring fastened on said nut in spaced relation to the ends of said arms and extending between said flange and ring, and a conductivity cell removably mounted in the tubular valve stem for axial movement therewith and having a part thereof positioned in that area of the tubular valve stem defined by the circumferential wall having the openings therein for contact of said part with the liquid entering through the opening.

2. A valve assembly including a housing adapted to be mounted on and in communication with a liquid flow conduit containing a liquid to be tested and a sleeve projecting rearwardly from the assembly, a tubular member reciprocably mounted in said housing and having a valve fixed on the forward end thereof, for reciprocation to and from closed position, a section of said tubular member adjacent the rear end thereof extending into said sleeve, a testing apparatus removably mounted in said tubular member for reciprocation therewith and manually operable means threadedly attachable to the rear end of said tubular member for releasably locking said testing apparatus within said tubular member, and said manually operable means being completely within said sleeve when the valve is open and being outside said sleeve when the valve is closed, and further means coactive with said sleeve preventing rotation of said manually operable means when it is within said sleeve.

3. A probe and valve assembly comprising: a hollow outer valve member, a hollow inner valve member slidable into said outer valve member, said inner valve member having an external thread at one end thereof and a perforated portion and a cap portion at the other end thereof, a probe slidable into said inner valve member, a retainer nut mounted on said probe and having an inner thread engageable over the external thread of said inner valve member, means to open and close said valve by moving the perforated portion of said inner valve member beyond or within said outer valve member, said last-named means comprising a rotatable valve nut having an inner thread engageable over the external thread of said inner valve member, and clamping means to hold together said valve nut and said outer valve member.

References Cited in the file of this patent

UNITED STATES PATENTS

| | | |
|---|---|---|
| 1,345,032 | Smith | June 29, 1920 |
| 1,670,640 | Smith | May 22, 1928 |
| 2,234,056 | Moore | Mar. 4, 1941 |